3,034,991
PROCESS FOR INCREASING THE CATALYTIC ACTIVITY OF IMPREGNATED ACTIVATED CARBON CATALYSTS
Otto Fruhwirth, Burghausen, Upper Bavaria, Germany, assignor to Wacker-Chemie G.m.b.H., Munich, Germany, a corporation of Germany
No Drawing. Filed Aug. 18, 1959, Ser. No. 834,384
Claims priority, application Germany Oct. 31, 1958
2 Claims. (Cl. 252—428)

This invention relates to producing catalysts by impregnating activated carbon with a catalytic substance, and it has for its object to provide a novel and improved process for this purpose.

Another object of the invention is to increase the effectiveness of catalysts of the above type and thereby enable catalytic chemical reactions to be performed at lower temperatures than heretofore.

Still another object is to increase the effective life span of catalysts of the type specified.

Various other objects and advantages will be apparent as the nature of the invention is more fully disclosed.

The activity and life span of contact substances in catalytic processes depends largely on the kind and quantity of the catalyst employed. Thus good activity and therefore low reaction temperatures are often achieved by the use of only a small quantity of catalyst, while the life span depends on the catalyst content insofar as the conversion becomes unsatisfactory after the content sinks below a certain quantity which causes inactivity, and the catalyst must be changed.

Heretofore the formation of the catalyst has generally been done in such a way that the carrier, for instance activated carbon or silica gel is covered over or sprayed with the impregnation fluid, for instance an aqueous solution of zinc acetate or barium chloride. In this way a relatively high catalyst content is created in the outer skin or shell, while the concentration diminishes in the direction of the interior of the particles. The impregnation can also be accomplished by immersion, perhaps after previous evacuation, whereby, it is true, all pores of the catalyst grain are completely filled, but the activity is reduced, and therefore a relatively high starting temperature is required in the chemical process in which the catalyst is employed.

I have now discovered that high surface activity, coupled with a long life span of the catalyst, is achieved when the saturation of the catalyst carrier is performed in two stages. The first stage is that, in accordance with the usual prior art process, the solid carrier is charged as highly as possible, for instance by immersion, and then by an after-treatment an increased activity is achieved.

The after-treatment can be performed with substances which loosen up the impregnation means by dissolving or evaporation, or displace them from the surface to the interior of the granules or particles. Suitable for this is, for instance, the solvent of the first impregnation process, water, further solvent vapors, steam, or inert gases. The after-treatment can be done in the liquid phase by submersion or pouring over; the vapor treatment by conducting the appropriate gas or steam over the substance.

The process is suitable for the treatment of catalysts which are used for chemical reactions in the liquid or gaseous phase. It has proved to be especially useful for catalysts which are used for the production of vinyl acetate, vinyl chloride or for the splitting of tetrachlorethane or pentachlorethane or for the oxidation of hydrochloric acid into chlorine in the presence or absence of hydrocarbons.

*Example 1*

If suitable activated carbon, such as activated charcoal, is covered over with a 50% aqueous solution of zinc acetate that is heated to 90° C., an average content of 18% of zinc is achieved in the catalyst substance. Thereafter the catalyst mass is submerged for 5 minutes in hot water. Thereby such a good activation of the surface is achieved, that the additive compounding of acetic acid to acetylene which otherwise proceeds at 180° C., can now be done at 170° C.

*Example 2*

For the catalytic splitting of tetrachlorethane the catalyst is usually made by pouring concentrated hot $BaCl_2$ solution over activated carbon, whereby a 30% content of barium chloride is achieved. This catalyst requires a starting temperature of 220° C. and has an average life span of 8000 hours. When the catalyst is prepared by spraying a hot concentrated aqueous $BaCl_2$ solution over agitated activated carbon until complete saturation sets in, and afterward the mass is treated for one hour with water vapor at 200° C., the resulting starting temperature is reduced by 20° C. and the life span of the catalyst is increased to 10,000 hours.

The invention claimed is:
1. A process for increasing the catalytic activity of a catalyst made by impregnating activated carbon with a 50% aqueous solution of zinc acetate at a temperature of about 90° C., which comprises submerging said catalyst-impregnated carbon in hot water for about 5 minutes.
2. A process for increasing the catalytic activity of a catalyst made by impregnating activated carbon with concentrated hot aqueous barium chloride, which comprises immersing said catalyst-impregnated carbon in water vapor at a temperature of about 200° C. for about an hour.

References Cited in the file of this patent
UNITED STATES PATENTS

| | | |
|---|---|---|
| 1,238,774 | Ittner | Sept. 4, 1917 |
| 2,377,217 | Dvornikoff et al. | May 29, 1945 |
| 2,485,044 | Gehrke | Oct. 18, 1949 |
| 2,727,023 | Evering et al. | Dec. 13, 1955 |